(12) United States Patent
Fehrenbach et al.

(10) Patent No.: US 7,770,858 B2
(45) Date of Patent: Aug. 10, 2010

(54) FIELD DEVICE COMPRISING A MOUNTING BRACKET ADAPTED FOR MOUNTING TO AN ATTACHMENT SURFACE

(75) Inventors: Josef Fehrenbach, Haslach (DE); Klaus Kienzle, Zell am Harmersbach (DE); Christian Sum, Wolfach (DE); Juergen Motzer, Gengenbach (DE); Thomas Deck, Wolfach (DE); Juergen Skowaisa, Schiltach (DE); Holger Sack, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 397 days.

(21) Appl. No.: 11/625,924

(22) Filed: Jan. 23, 2007

(65) Prior Publication Data

US 2007/0181764 A1 Aug. 9, 2007

Related U.S. Application Data

(60) Provisional application No. 60/771,055, filed on Feb. 7, 2006.

(30) Foreign Application Priority Data

Feb. 7, 2006 (DE) ........................ 10 2006 005 531

(51) Int. Cl.
*E04G 3/00* (2006.01)
(52) U.S. Cl. .................. 248/291.1; 248/284.1; 362/371; 362/431
(58) Field of Classification Search ............... 248/291.1, 248/292.14, 316.8, 284.1, 299.1; 362/371, 362/431
See application file for complete search history.

(56) References Cited

U.S. PATENT DOCUMENTS 2,166,394 A * 7/1939 Crossley .................... 362/371

(Continued)

FOREIGN PATENT DOCUMENTS

DE 7216657 8/1972

(Continued)

OTHER PUBLICATIONS

Vega Brochure, No. 2.27644, pp. 1-28.

(Continued)

*Primary Examiner*—Anita M King
(74) *Attorney, Agent, or Firm*—Fay Kaplun & Marcin, LLP

(57) ABSTRACT

A mounting bracket is adapted for mounting a field device, as well as to a field device that for the purpose of attachment to a mounting surface comprises such a mounting bracket. The mounting bracket comprises (a) a first bracket strap which includes a first rotary bearing, (b) a second bracket strap, spaced apart from the first bracket strap by a space, including a second rotary bearing and (c) at least one movable lock on one of the two bracket straps. The rotary bearings are designed to articulate on two opposing sides of a field device that may be arranged in the space so that the field device may be rotated, on an imaginary axis that extends through the space, from a first angle position to a second angle position. The lock is designed to engage the field device in order to in this way resist a torque of the field device in that the lock converts the torque to a pair of forces which is removable by way of one of the rotary bearings and by way of the lock itself.

26 Claims, 4 Drawing Sheets

U.S. PATENT DOCUMENTS

| | | | |
|---|---|---|---|
| 2,734,708 A * | 2/1956 | Cohn | 248/517 |
| 3,802,277 A * | 4/1974 | Pandjiris et al. | 74/16 |
| 4,410,933 A * | 10/1983 | Blake et al. | 362/371 |
| 5,205,645 A * | 4/1993 | Lee | 362/431 |
| 5,320,311 A * | 6/1994 | Jensen et al. | 248/27.1 |
| 6,113,047 A * | 9/2000 | Wung et al. | 248/284.1 |
| 6,213,626 B1 * | 4/2001 | Qian | 362/413 |
| 6,227,681 B1 * | 5/2001 | Shoemaker et al. | 362/269 |
| 2003/0222187 A1 | 12/2003 | Tai | |

FOREIGN PATENT DOCUMENTS

| | | |
|---|---|---|
| DE | 30 08 233 | 9/1989 |
| DE | 92 11 455 | 1/1993 |
| DE | 33 82 731 | 5/1994 |
| DE | 195 21 785 | 1/1997 |
| DE | 297 11779 | 10/1997 |
| DE | 100 34 026 | 1/2002 |
| DE | 10 2004 033 477 | 5/2005 |
| EP | 0237698 | 9/1987 |
| EP | 1172600 | 1/2002 |

OTHER PUBLICATIONS

VEGACAP series 60, 1 sheet.
VEGAPULS 61, Apr. 10, 2006, 1sheet.

* cited by examiner

FIELD DEVICE COMPRISING A MOUNTING BRACKET ADAPTED FOR MOUNTING TO AN ATTACHMENT SURFACE

PRIORITY CLAIM

This application claims the benefit of the filing date of U.S. Provisional Patent Application Ser. No. 60/771,055 filed Feb. 7, 2006 and German Patent Application Serial No. 10 2006 005 531.4 filed Feb. 7, 2006, the disclosures of which is hereby incorporated herein by reference.

FIELD OF THE INVENTION

The present invention generally relates to the technical field of fill level measuring technology and pressure measuring technology. In particular, the present invention relates to a mounting bracket for attaching a field device, as well as to a field device which for the purpose of attachment to a mounting surface comprises such a mounting bracket.

In the context of the present invention the generic term "field device" may cover various designs of sensors that can be based on various measuring principles. The term field device covers, for example, fill level measuring devices, pressure measuring devices, boundary state detection measuring devices as well as temperature measuring devices, to name but a few examples. In relation to fill level measuring devices it should be pointed out that this includes in particular so-called TDR fill level measuring devices, radar measuring devices as well as ultrasound measuring devices. In relation to boundary value transmitters, this includes, for example, vibration boundary value transmitters, ultrasound boundary value transmitters as well as capacitively or conductively operating boundary value transmitters.

Field devices that are based on the above-mentioned measuring principles are, for example, marketed under the trademarks VEGAPULS, VEGASON, VEGAFLEX, VEGASWING, VEGABAR, VEGACAP by the company VEGA Grieshaber KG, Germany.

BACKGROUND TO THE INVENTION

Field devices such as, for example, fill level measuring devices or pressure measuring devices are, for example, used in process technology in order to measure the fill level or the pressure in a container. To this effect the corresponding devices have to be attached in or to the container; this frequently takes place either by means of a flange attachment or by means of a screw-in attachment. In the flange attachment, a fill level measuring device comprises, for example, a dish-shaped flange that encloses the aerial collar of the device in a flange-like manner in order to be screwed to a corresponding counter-flange in the region of an opening of the container. In the case of screw-in attachment the aerial collar itself comprises an external thread so that by way of the external thread the fill level measuring device may be screwed into a corresponding internal thread in a corresponding container opening.

The attachment methods described, which use a flange or a screw-in thread, are however relatively inflexible and allow only attachment of the field device in a particular predefined position on the container.

In the case of particular process conditions or ambient conditions it is, however, often necessary to attach a fill level sensor or a pressure measuring device to the inside of a container, for example to the side wall or to the inside of an inclined container cover or to open gutters or collection containers. To this effect, rotatable brackets have been developed by means of which the devices were able to be attached to the areas mentioned. However, these brackets were regularly associated with a disadvantage in that once a rotation position of the field device was set, they could not permanently hold this position as a result of undesired vibration or other mechanical influence so that a precisely set measuring position of the field device could not be maintained over time, which in the end resulted in incorrect and poor measuring results.

SUMMARY OF THE INVENTION

Starting with the above-described attachment methods there may be a need to state an implementation by means of which a field device such as, for example, a fill level measuring device, a pressure measuring device or a boundary state detection measuring device may be attached to an attachment surface of any inclination, which implementation makes it possible to align the field device to any desired measuring position that may then be permanently maintained.

According to a first aspect of the present invention this need may be met by a mounting bracket that is specially designed to attach a field device to an attachment surface. To this effect the mounting bracket comprises a first bracket strap which comprises a first rotary bearing. Furthermore, the mounting bracket comprises a second bracket strap which comprises a second rotary bearing, wherein this second bracket strap is spaced apart from the first bracket strap by a space. The two rotary bearings can, for example, be simple through-holes in the respective bracket straps, or corresponding pivots that are formed on or attached to the two bracket straps. Furthermore, the mounting bracket according to the invention comprises a lock that is movably arranged on one of the two bracket straps so as to prevent any undesired rotation of a field device held to the mounting bracket, as will be explained below. In order to be able to accommodate a field device in the mounting bracket the two rotary bearings are designed to articulate, on two opposing sides, a field device that may be arranged in the space between the two bracket straps, to which effect the two bracket straps encompass or flank the field device in the manner of a bracket. As a result of the articulation a field device may be rotated on an imaginary axis that extends through the two bracket straps, from a first angle position to a second angle position so that the field device may be aligned almost in any position. In order to permanently maintain a second angle position set in this way, the lock is used, which is designed to engage the field device. When the lock, which itself is arranged on one of the bracket straps, engages the field device, said lock may resist a torque that results from a rotary movement of the field device, in that said lock converts the torque to a pair of forces which are then removed by way of one of the rotary bearings as well as the lock itself by way of one of the bracket straps, in particular by way of that bracket strap to which the lock is attached. In this arrangement the lock prevents any rotation of the field device relative to the mounting bracket or vice-versa in that the mounting bracket is connected, having non-positive or positive fit, to the field device so that unintended rotation of the field device becomes impossible.

The mounting bracket or the two bracket straps may be made from flat steel that in the region of the rotary bearings may have disc-like expansions so that there is sufficient space to arrange the lock. The rotary bearings may, for example, be simple through-holes through which screws may be screwed as hinge pins into the field device to be attached. As an alternative to this, the jacket surface of the field device may, for example, comprise hinge pins which may rotatably engage the through-holes of the bracket strap. Yet another embodiment of the rotary bearings may be designed so that the rotary bearings themselves are hinge pivots formed in one piece to the two bracket straps that may engage corresponding openings in the jacket surface of the field device.

The two bracket straps themselves are spaced apart from each other so that between them a field device may be rotatably fitted, wherein the two bracket straps may be of such a shape that they do not impede rotary movement of the field device in the mounting bracket.

The lock can, for example, be a pivot or a pin that may be movably arranged on one of the bracket straps in order to engage the field device or a section in the jacket surface of the field device so as to in this way permanently determine a set second angle position. For example, the lock may comprise a screw that is screwed into one of the bracket straps so as to be eccentric in relation to one of the rotary bearings, wherein said screw may be screwed into a jacket surface of the field device so that the strap may no longer be rotated in relation to the field device or vice-versa.

For the purpose of accommodating the screw, the first bracket strap can, for example, comprise a first through-hole through which the screw may be made to engage the jacket surface of the field device in that the screw is turned further into the through-hole in the direction of the field device, as a result of which a second angle position may be permanently determined in that the screw prevents rotation of the field device in relation to the first bracket strap.

In order to be able to affix the field device at defined angle positions, the first bracket strap can, for example, comprise several first through-holes that are all arranged by a defined radian measure on a circular arc so as to be offset in relation to each other so that the field device is affixed at defined angle positions when in alternative installation states the screw engages the jacket surface of the field device through different ones of the first through-holes.

In order to engage the jacket surface of the field device, the field device can, for example, comprise an opening that matches the diameter of the screw shaft into which opening the screw for affixing the field device may be screwed through one of the first through-holes in the first bracket strap. To this effect the opening in the jacket surface can, for example, be a blind hole with or without an internal thread. In cases where the opening in the jacket surface of the field device does not comprise a corresponding internal thread, the opening diameter should precisely match the shaft diameter of the screw so that the screw may engage the opening in a positive-locking manner. In cases where the opening comprises an internal thread the screw may be screwed into it to fix the field device and may be tightened, as a result of which the field device may be tightened against the first bracket strap, which provides particularly reliable affixation of the field device in relation to undesired rotary movement.

Since a standard situation of installing a field device in a container can, for example, be designed such that the field device is to be attached to a perpendicular internal wall while another installation situation may be designed such that a field device is to be installed on a horizontal container wall, it is desirable to design the mounting bracket such that with it a field device may be aligned at defined angles to horizontal, without this angle position having, in addition, to be manually measured during installation. In order to ensure this, the individual first through-holes of the multitude of first through-holes may be arranged in the first bracket strap so as to be offset in relation to each other by a radian measure of $n \cdot \pi/8$ with $n \in IN^*$, which makes possible angle positions of the field device in the bracket in increments of 22.5°. Of course it is possible to provide a finer hole arrangement so that a still finer angle position of the field devices becomes possible.

However, since container walls may also have any desired inclination, or since for other reasons a field device is to be aligned at any desired angle, it is desirable for the bracket strap to comprise a lock that makes it possible to set the field device at infinitely variable positions. To this effect the second bracket strap may, for example, comprise at least a second through-hole that is in the shape of a circular arc, through which through-hole it is also possible for a screw to engage the jacket surface of the field device in order in this way to tighten the field device in the second position against the second bracket strap. In order to change the angle position of the field device in this arrangement, the screw may be loosely screwed into a corresponding opening in the jacket surface of the field device and may at the same time extend through the circular-arc-shaped second through-hole in the second bracket strap so that infinitely variable adjustment of the angle position becomes possible. However, to prevent a situation in which during such rotation the screw becomes jammed in the circular-arc-shaped second through-hole, the centre of the circular-arc-shaped second through-hole is situated on the imaginary axis that extends through the space between the first bracket strap and the second bracket strap. This ensures that when the mounting bracket is rotated, the screw which has been screwed into the jacket surface of the field device moves on the circular arc defined by the circular-arc-shaped second through-hole. By screwing the screw into a screw-in opening in the jacket surface of the field device, which screw-in opening is flush with the circular-arc-shaped second through-hole, a non-positive connection between the second bracket strap and the jacket surface of the fill level measuring device may be ensured in that the jacket surface of the field device is tightened against the second bracket strap. To make it possible to affix the mounting bracket itself to an attachment surface, the mounting bracket further comprises a connecting web, which interconnects the first bracket strap and the second bracket strap in one piece. In this arrangement the connecting web extends parallel in relation to the imaginary axis that is defined by the space between the first bracket strap and the second bracket strap. In order to attach the mounting bracket, the middle of said connecting web comprises a through-hole so that through this through-hole the mounting bracket may be affixed to an attachment surface by means of a screw. The mounting bracket may thus in its entirety be rotated on an axis that extends so as to be perpendicular to the imaginary axis between the two bracket straps so that in combination with the rotary axis between the two bracket straps, a field device accommodated by the mounting bracket may be brought into almost any rotary position in space.

According to a further aspect of the present invention a field device is stated whose jacket surface is specially designed to attach the field device to an attachment surface by means of the mounting bracket described in the passages above. In this arrangement the field device comprises a jacket surface that is designed to be rotatably articulated in the space between the first bracket strap and the second bracket strap of the mounting bracket on the first rotary bearing and the second rotary bearing. In this arrangement in particular the jacket surface of the field device is arranged in the space between the first bracket strap and the second bracket strap, and the field device is held so as to articulate on the rotary bearings at two opposite sides so that the field device may be rotated, on an imaginary axis that extends through the two rotary bearings, from a first angle position to a second angle position.

For attachment to the two rotary bearings the field device can, for example, comprise two opposite openings in its jacket surface, which openings the rotary bearings in the form of pivots or screws may engage in an articulated manner.

Furthermore, the jacket surface of the field device comprises at least one further opening that is arranged such that by a rotary movement of the field device it may be made to be flush with one of the first through-holes of the first bracket strap so that the above-mentioned lock screw may be arranged therein so that it extends from one of the first through-holes into the opening in the jacket surface. In this way the first bracket strap is connected, by way of the screw, to the field device or its jacket surface so that undesired rotation of the field device in relation to the mounting bracket is impossible.

The previously mentioned opening in the jacket surface may be arranged such that during a rotary movement of the field device it may be made to be flush with the second through-hole of circular-arc shape of the second bracket strap so that the screw may be arranged such that during the rotary movement it extends through the arc-shaped through-hole into the opening in the jacket surface so as to in this way tighten the jacket surface of the field device to the second bracket strap by means of the screw.

According to still another aspect, in order to meet the need of the present invention a field device is stated which comprises a mounting bracket with which the field device may be attached to an attachment surface. In this arrangement the mounting bracket of the field device comprises a first bracket strap with a first rotary bearing, as well as a second bracket strap, spaced apart from the first bracket strap, with a second rotary bearing. Moreover, the mounting bracket comprises at least one lock that is movably arranged on one of the two bracket straps. In order to be able to attach the field device to an attachment surface by means of the mounting bracket the field device is fitted in the space between the two bracket straps, which on the two rotary bearings articulate the field device on two opposite sides of its jacket surface. In this way the field device may be rotated, on an imaginary axis that extends through the space, from a first angle position into a second angle position. In order to be able to permanently fix a second angle position set in this way, the lock is designed to engage the field device. Because the lock thus connects the field device with one of the two bracket straps it is able to resist a torque of the field device in that it splits the torque up into a pair of forces that may be removed by way of one of the rotary bearings and the lock itself.

The lock can, for example, comprise a screw which, through the first bracket strap, may be made to engage the jacket surface of the field device so as to in this way permanently determine the second angle position in that it prevents rotation of the field device in relation to the first bracket strap. Of course, instead of a screw the lock may also comprise a pin or a pivot that may be made to engage the field device in a positive locking manner instead of the screw.

In order to accommodate the screw or a pivot or a pin, the first bracket strap comprises at least a first through-hole through which the screw may be made to engage the jacket surface of the field device so as to in this way permanently determine the second angle position.

In order to be able to fix the field device not only in one angle position, the first bracket strap comprises several first through-holes that are all located on a circular arc and are arranged so as to be offset in relation to each other by a defined radian measure so that the field device may be affixed at defined angle positions. To this effect in alternative installation states the pivot is made to engage the jacket surface of the field device through different ones of the first through-holes, as a result of which, further rotation of the field device is impossible. As has already been mentioned above, the first through-holes may be arranged so as to be offset in relation to each other by a radian measure of a multiple of $\pi/8$ so that the field device may be affixed to the mounting bracket in increments of 22.5°. Of course it is also possible to provide a finer hole arrangement so that a still finer angle position of the field devices becomes possible.

However, since the container walls may also have any desired inclination, or since for other reasons a field device is to be aligned at any desired angle, it is desirable for the bracket strap to comprise a lock that makes it possible to set the field device at infinitely variable positions. To this effect the second bracket strap may, for example, comprise at least one second through-hole that is circular-arc-shaped, through which through-hole it is also possible for a screw to be made to engage the jacket surface of the field device in order to in this way tighten the field device in the second position to the second bracket strap. In order to change the angle position of the field device in this arrangement, the screw may be loosely screwed into a corresponding opening in the jacket surface of the field device and may at the same time extend through the circular-arc-shaped second through-hole in the second bracket strap so that infinitely variable adjustment of the angle position becomes possible. However, to prevent a situation in which during such rotation the screw becomes jammed in the circular-arc-shaped second through-hole, the centre of the circular-arc-shaped second through-hole is situated on the imaginary axis that extends through the space between the first bracket strap and the second bracket strap. This ensures that, when the mounting bracket is rotated, the screw which has been screwed into the jacket surface of the field device moves on the circular arc defined by the circular-arc-shaped second through-hole. By screwing the screw into a screw-in opening in the jacket surface of the field device, which screw-in opening is flush with the circular-arc-shaped second through-hole, a non-positive connection between the second bracket strap and the jacket surface of the fill level measuring device may be ensured in that the jacket surface of the field device is tightened against the second bracket strap.

To make it possible to affix the mounting bracket itself to an attachment surface, the mounting bracket further comprises a connecting web, which interconnects the first bracket strap and the second bracket strap in one piece. In this arrangement the connecting web extends parallel in relation to the imaginary axis that is defined by the distance between the first bracket strap and the second bracket strap. In order to attach the mounting bracket, the middle of said connecting web comprises a through-hole so that through this through-hole the mounting bracket may be affixed to an attachment surface by means of a screw. The mounting bracket may thus in its entirety be rotated on an axis that extends so as to be perpendicular to the imaginary axis between the two bracket straps so that in combination with the rotary axis between the two bracket straps, a field device accommodated by the mounting bracket may be brought into almost any rotary position in space.

BRIEF DESCRIPTION OF THE DRAWINGS

Below, the invention is described in an exemplary manner with reference to the enclosed drawings. It should be stressed that the embodiments of the invention as shown in the figures are merely exemplary embodiments of the invention and are, in particular, not to be interpreted as limiting the scope of protection of the invention. The following are shown.

Throughout all the figures, the same or corresponding reference characters are used for identical or similar elements. The illustrations in the figures are not necessarily to scale, but they may indicate qualitative size relationships.

DESCRIPTION OF EXEMPLARY EMBODIMENTS OF THE INVENTION

Figure 1:
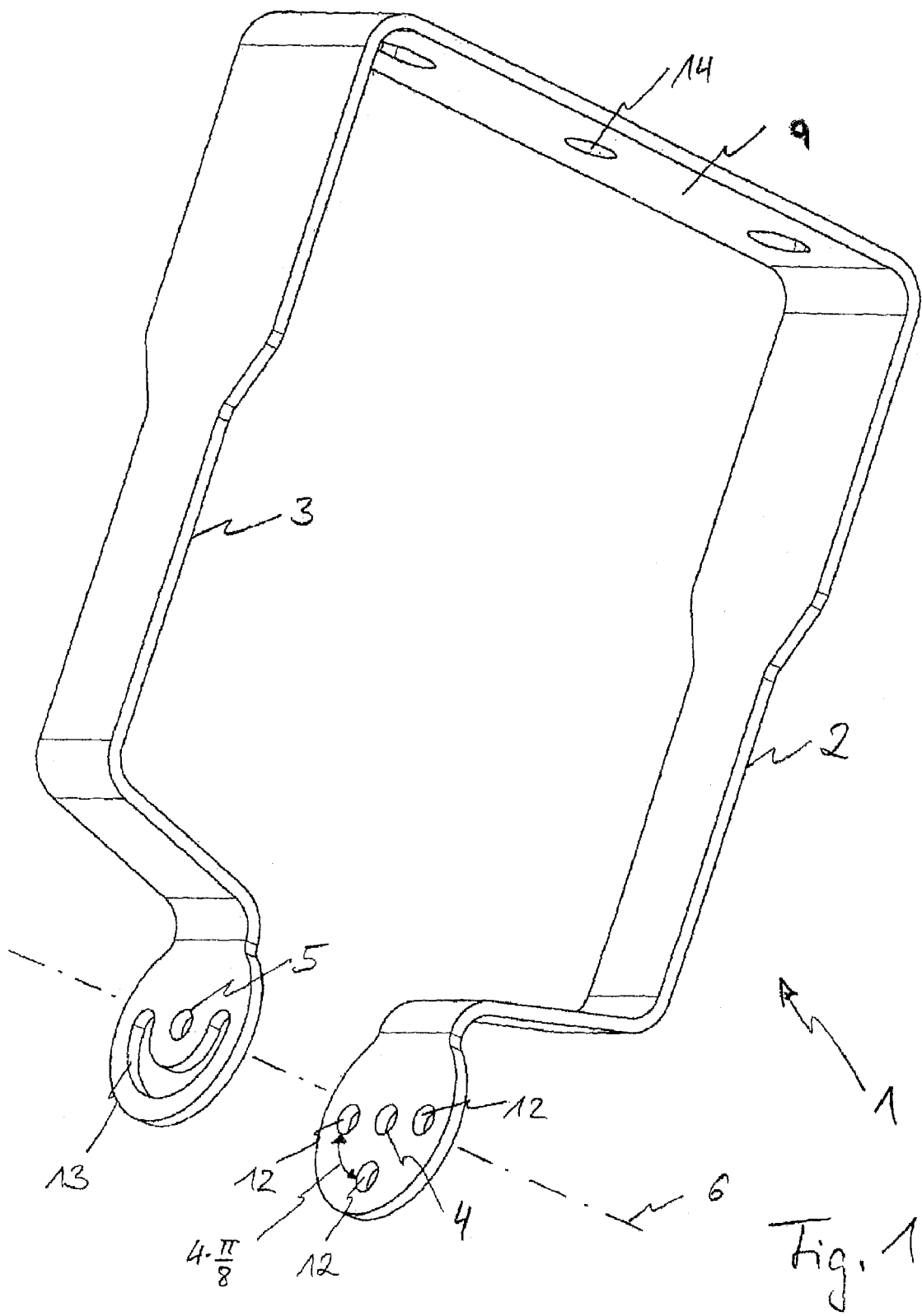
FIG. 1 shows a perspective view of a mounting bracket according to an exemplary embodiment of the invention.

FIG. 1 shows a perspective view of the mounting bracket 1 according to the invention. The mounting bracket 1 essentially is of a U-shaped bent design, wherein the two legs of the U at their free ends approach each other in the shape of two non-bent leg sections. The mounting bracket 1 may, for example, be made from flat steel that may, for example, be stainless steel such as, for example, V2A steel, V4A steel, or galvanised steel. Of course, the use of aluminium or aluminium alloys is also imaginable. As an alternative to this the mounting bracket 1 may, for example, be made from plastic, for example from polyamide, polypropylene or polycarbonate. Combinations of filled plastics, e.g. with glass fibre, are also possible.

As shown in FIG. 1 the mounting bracket 1 comprises a first bracket strap 2 as well as a second bracket strap 3. These two bracket straps 2, 3 are connect to each other by way of a connecting web 9, in which in the middle there is a through-hole 14 in order to attach the mounting bracket 1 to an attachment surface, for example by means of a screw connection. As a result of such a screw connection the bracket strap 1 in its entirety may be rotated on an axis that extends through the through-hole 14 and parallel in relation to the bracket straps 2, 3.

Figure 2:
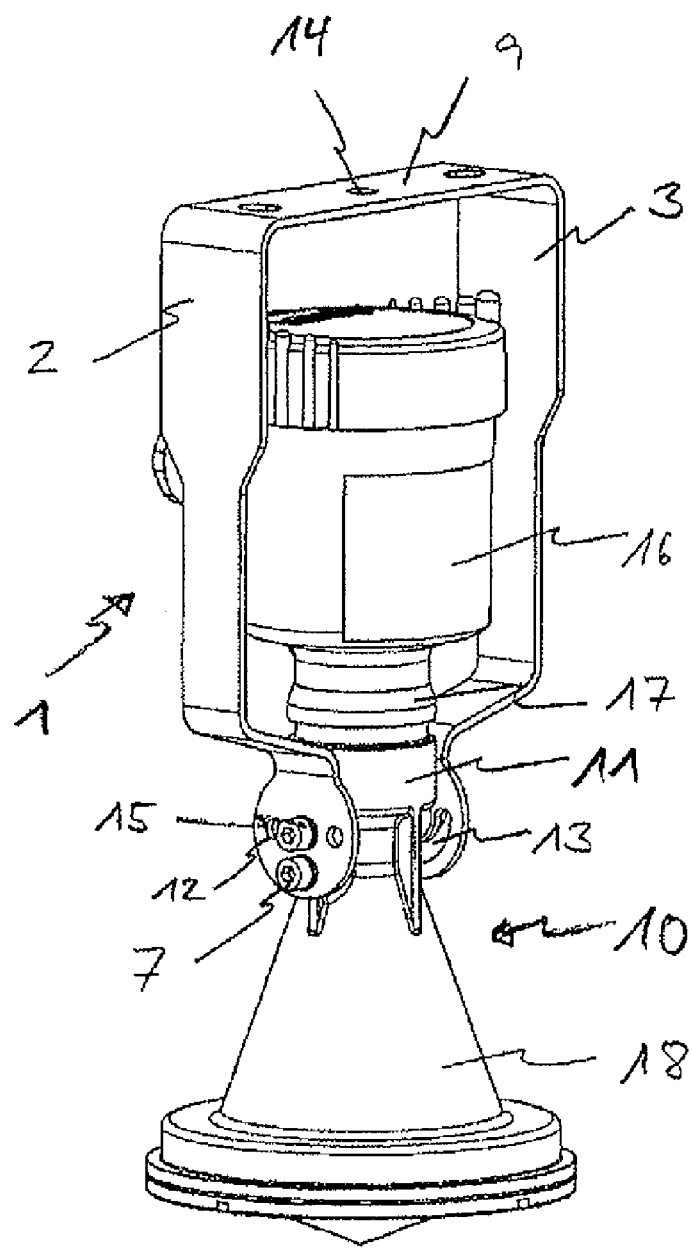
FIG. 2 shows a perspective view of a fill level measuring device with a mounting bracket according to an exemplary embodiment of the present invention in a zero degree position.
Figure 3:
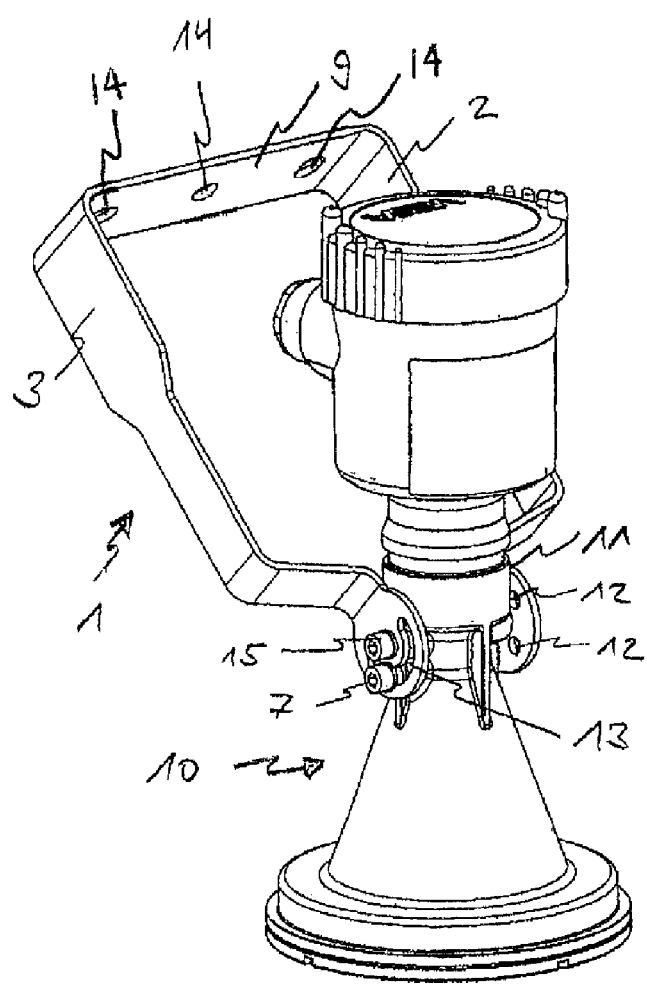
FIG. 3 shows a further perspective view of a fill level measuring device according to the invention with a mounting bracket according to the invention in a 45° position.
Figure 4:
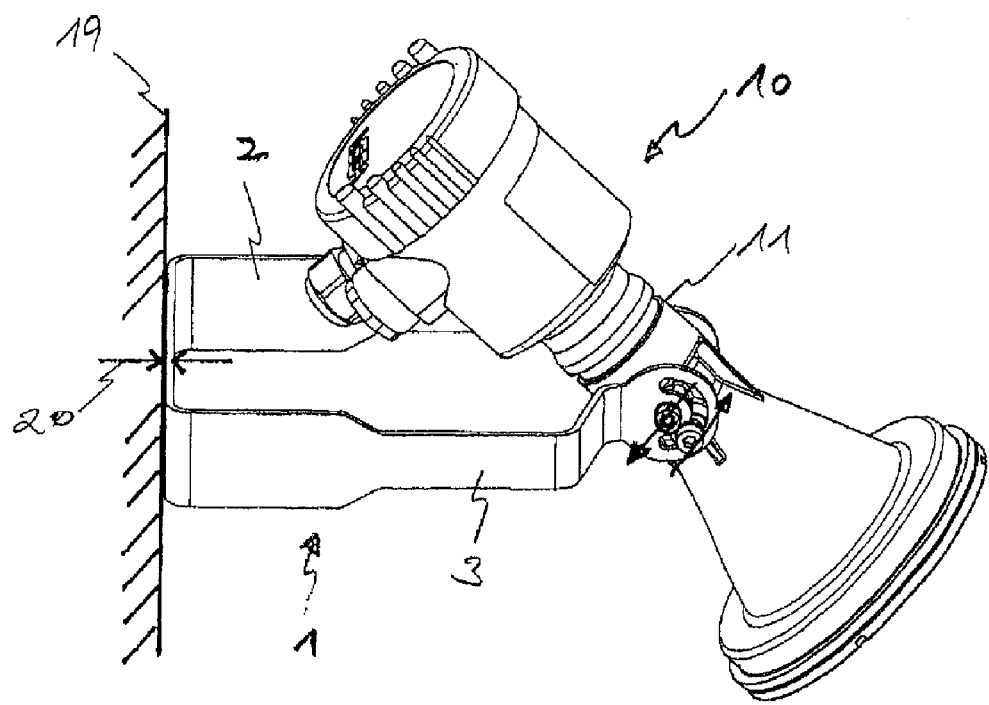
FIG. 4 shows a further perspective view of a fill level measuring device according to the invention with a mounting bracket according to the invention in a state attached to an attachment surface.

The two bracket straps 2, 3 extend essentially parallel in relation to each other and are spaced apart from each other so that in the space between them a field device, for example as shown in FIGS. 2-4, may be arranged. On their free ends the two bracket straps 2, 3 approach each other, which is effected as a result of a corresponding bent shape on the free ends of the bracket straps 2, 3. On their free ends the two bracket straps 2, 3 comprise plate-shaped or disc-shaped expansions to provide corresponding space for the rotary bearings 4, 5 as well as for the lock; this will be explained in more detail below.

As shown in FIG. 1 the disc-shaped expansion of the first bracket strap 2 comprises a first rotary bearing 4, and the disc-shaped expansion of the second bracket strap 3 comprises a second rotary bearing 5. In this arrangement the two rotary bearings 4, 5 have the shape of a simple through-hole in the respective free ends of the two bracket straps 2, 3. In these two rotary bearings 4, 5 a field device 10 is rotatably held, as shown in FIGS. 2-4; this will be explained in detail later on.

The free end of the first bracket strap 2 not only contains the through-hole for the rotary bearing 4 but also three further through-holes 12 through which a corresponding lock may be made to engage a field device to be held by the bracket strap 2. In this arrangement the three through-holes 12 are arranged so as to be offset by a radian measure of $4\cdot\pi/8$ so that a field device may accordingly be affixed at 90 degree increments in the mounting bracket 1.

Apart from the second rotary bearing 5 in the form of a through-hole the disc-shaped expansion on the free end of the second bracket strap 3 comprises a further through-hole 13 that is circular-arc-shaped. A screw may be inserted through this through-hole 13 (second through-hole) so as to engage the jacket surface of a field device that is to be held by the mounting bracket 1. The through-hole 13 extends over a radian measure of approximately $\pi$ so that a field device may correspondingly be swiveled by 180° and may be affixed in any desired position by means of a screw that extends through the through-hole 13 into the field device, in that the free end of the second bracket 3 is tightened to the field device by means of the screw.

Below, with reference to FIGS. 2-4 the function of the mounting bracket according to the invention is to be explained in more detail.

As shown in FIG. 2, a field device 10 which, for example, can be a fill level measuring device, a pressure measuring device or a boundary state switch, has been fitted into the space between the first bracket strap 2 and the second bracket strap 3. The device shown in FIG. 2 is a fill level measuring device that when viewed from the outside essentially comprises a housing 16 and an aerial horn 18 that is attached to said housing 16 by way of a process connection 17. The housing 16 comprises the individual electronics components for generating and processing microwaves, with which electronics components fill level measuring with the fill level measuring device 10 takes place. In this arrangement the microwaves are emitted by way of the aerial horn 18 in the direction of a feed material surface from which they are reflected back to the fill level measuring device 10 so that, by way of transit time measuring of the microwaves, conclusions may be drawn concerning the distance of the feed material from the fill level measuring device 10, and from this the fill level height may be determined.

In the exemplary embodiment shown in FIGS. 2-4 the fill level measuring device 10 is articulated, in the region of the process connection 17 or in the region of the aerial collar, on the rotary bearings 4, 5 of the two bracket straps 2, 3. To this effect two screws 15 extend through the two rotary bearings 4, 5 that are in the form of simple through-holes, which two screws 15 on two opposite sides engage the aerial collar or the process connection 17 so that the field device 10 may be rotated on an imaginary axis that extends through the space between the two bracket straps 2, 3.

The bracket strap 1 further comprises a lock with which the field device 10 may alternatively be fixed to the bracket strap 1 at defined angle positions or at any desired angle positions. The lock may, for example, be a simple screw 7 which, for example, may be fed through one of the through-holes 12 in the first bracket strap so as to engage the field device, for which purpose the field device comprises in its jacket surface a corresponding opening, in FIG. 2 in the region of the process connection or of the aerial collar, into which opening the screw 7 may be screwed.

If the fill level device 10 that has been affixed in this way attempts to rotate, the torque generated is split into a pair of forces (see FIG. 4) which is removed into the first bracket strap 2 by way of the rotary bearing 3 as well as by way of the screw 7. In order to fix the field device 10 in FIG. 2 in a position rotated by 90 degrees the screw 7 is undone so that the field device 10 may be rotated by +90° or −90°. In this position rotated by +/−90° the opening in the jacket surface of the field device 10 is flush with the through-hole 12 offset by a radian measure of $\pi/2$ or $-\pi/2$ so that in this position the field device 10 may again be affixed in that the screw 7 is screwed through the through-hole 12 that is offset by $+\pi/2$ or $-\pi/2$ into the opening in the aerial collar or process connection 17.

Instead of providing several through-holes 12 in the plate-shaped expansion at the end of the first bracket strap 2, through which through-holes 12 a screw 7 may be made to engage the field device 10, it would of course also be imaginable to provide only one through-hole 12 in the first bracket strap 2, and instead provide several openings in the aerial collar or in the process connection 17, which openings are all situated on a circular arc, which in a rotary movement of the field device 10 pass the one through-hole 12 in the free end of the first bracket strap, so that in this way the field device may be affixed in defined angle positions in that the screw 7 is made to engage these various openings in the field device through the one through-hole 12 in the first bracket strap.

Should it be desirable to affix the field device 10 at desired angle positions in relation to the mounting bracket, the lock 7 in the form of a screw on the mounting bracket 1 may be fed through the semicircular through-hole 13 in order to be screwed into a screw thread in the aerial collar or in the region of the process connection of the field device 10 in order to in this way tighten the plate-shaped expansion on the free end of the second bracket strap 3 to the aerial collar or to the process connection 17. Since the centre of the circular through-hole 13 is situated on the imaginary axis that extends through the space between the first bracket strap 2 and the second bracket strap 3, the field device 10 may be rotated in the mounting bracket 1 without the screw 7 becoming jammed in the circular-arc-shaped through-hole 13. Instead, the screw-in opening in the aerial collar or in the process connection 17, into which the screw 7 may be screwed through the circular-arc-shaped through-hole 13, in any desired angle position of the field device 10 is always flush with the circular-arc-shaped through-hole 13 so that the field device 10 may be rotated without any hindrance to any desired angle position in which it may be affixed by means of the screw 7 in that this screw 7 is screwed into the thread opening in the aerial collar or in the process connection 17, as a result of which said aerial collar or process connection is tightened against the plate-shaped expansion on the free end of the second bracket strap.

Lastly, FIG. 4 shows a mounting position of the field device 10 in that said field device 10 is rotated by approximately 45°. In this arrangement the mounting bracket 1 is firmly screwed to an attachment surface 19 by means of a screw attachment 20 through the through-hole 14 in the connecting web 9 so that the bracket 1 together with the field device 10 may be rotated on this screw connection so that the field device 10 may be aligned in space in almost any direction. In order to make it possible to make subsequent adjustments around the screw connection 20 through the through-hole 14, the two outer through-holes in the connecting web 9 are elongated holes so that when this screw attachment 20 is slightly undone, subsequent alignment around the through-hole 14 becomes possible.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

1 Mounting bracket
2 First bracket strap
3 Second bracket strap
4 First rotary bearing
5 Second rotary bearing
6 Rotary axis
7 Lock-screw
8 Pair of forces
9 Connecting web
10 Field device
11 Jacket surface
12 First through-hole
13 Second through-hole
14 Through-hole in 9
15 Pivot-socket-head cap screw
16 Housing
17 Process connection
18 Horn aerial
19 Attachment surface
20 Screw attachment

The invention claimed is:

1. A mounting bracket for mounting a field device to an attachment surface, comprising:
a first bracket strap including a first rotary bearing;
a second bracket strap, spaced apart from the first bracket strap by a space, including a second rotary bearing; and
at least one movable lock on one of the two bracket straps;
wherein the first and second bracket straps approach each other at their free ends,
wherein the first and second rotary bearings articulate on two opposing sides of the field device that is arranged in the space so that the field device is rotated, on an imaginary axis which extends through the space, from a first angle position to a second angle position,
wherein the field device may be swivelled by 180°,
wherein the lock engages the field device to resist a torque of the field device, in that the lock converts the torque to a pair of forces which is removable using (i) the second rotary bearing and (ii) the lock itself, and
wherein the first bracket strap includes a plurality of first through-holes which are arranged by a defined radian measure on a circular arc so as to be offset in relation to each other so that the field device is determinable at defined angle positions when in alternative installation states the lock engages a jacket surface of the field device through different ones of the first through-holes.

2. The mounting bracket of claim 1, wherein the lock includes a screw which engages a jacket surface of the field device to permanently determine the second angle position.

3. The mounting bracket of claim 2, wherein the first bracket strap includes at least one first through-hole through which the screw engages the jacket surface of the field device to permanently determine the second angle position.

4. The mounting bracket of claim 2, wherein the screw affixing the field device and is screwed through one of the first through-holes into a suitable opening of the jacket surface of the field device.

5. The mounting bracket of claim 2, wherein the second bracket strap includes at least a second through-hole of a circular-arc shape, through which through-hole the screw engages the jacket surface of the field device to tighten the field device in the second angle position to the second bracket strap.

6. The mounting bracket of claim 5, wherein a center of the circular-arc-shaped through-hole is situated on the imaginary axis that extends through the space between the first bracket strap and the second bracket strap.

7. The mounting bracket of claim 1, wherein an individual first through-holes of the plurality of first through-holes are arranged so as to be offset in relation to each other by a radian measure of a multiple of π/8.

8. The mounting bracket of claim 1, further comprising:
a connecting web, which interconnects the first bracket strap and the second bracket strap in one piece, the connecting web extending parallel in relation to the imaginary axis that is defined by the space between the first bracket strap and the second bracket strap, the connecting web at its middle includes a through-hole for attaching the mounting bracket to the attachment surface.

9. The mounting bracket of claim 1, wherein the first rotary bearing and the second rotary bearing are through-holes in the two bracket straps, in which the field device is articulated using two pivots.

10. The mounting bracket of claim 1, wherein the field device is a fill level measuring device, wherein the space is in one of a region of a process connection and a region of an aerial collar.

11. A field device comprising:
a jacket surface attaching the field device to an attachment surface using a mounting bracket,
wherein the mounting bracket includes (a) a first bracket strap including a first rotary bearing; (b) a second bracket strap, spaced apart from the first bracket strap by a space, including a second rotary bearing; and (c) at least one movable lock on one of the two bracket straps,
wherein the first and second bracket straps approach each other at their free ends,
wherein the first and second rotary bearings articulate on two opposing sides of the field device that is arranged in the space so that the field device is rotated, on an imaginary axis which extends through the space, from a first angle position to a second angle position,
wherein the field device may be swivelled by 180°,
wherein the lock engages the field device to resist a torque of the field device, in that the lock converts the torque to a pair of forces which is removable using (i) the second rotary bearings and (ii) the lock itself; and
wherein the first bracket strap includes a plurality of first through-holes which are arranged by a defined radian measure on a circular arc so as to be offset in relation to each other so that the field device is determinable at defined angle positions when in alternative installation states the lock engages a jacket surface of the field device through different ones of the first through-holes.

12. The field device of claim 11, wherein the field device is rotatably held on the first rotary bearing and the second rotary bearing.

13. The field device of claim 12, wherein the jacket surface is arranged in the space between the first bracket strap and the second bracket strap, the field device being held so as to articulate on the rotary bearings at two opposite sides so that the field device may be rotated, on an imaginary axis that extends through the two rotary bearings, from a first angle position to a second angle position.

14. The field device of claim 11, wherein the jacket surface including at least one opening that, by a rotary movement of the field device, is flushed with one of the first through-holes of the first bracket strap so that the screw is arranged so that it extends from one of the first through-holes into the opening in the jacket surface.

15. The field device of claim 11, wherein the opening, during a rotary movement of the field device, is flushed with the second through-hole of circular-arc shape of the second bracket strap so that the screw is arranged such that during the rotary movement it extends from the circular-arc-shaped through-hole into the opening so as to in this way tighten the jacket surface of the field device to the second bracket strap.

16. The field device of claim 11, wherein the field device is a fill level measuring device, wherein the space is in one of a region of a process connection and a region of an aerial collar.

17. A field device comprising:
a mounting bracket for attaching the field device to an attachment surface, the mounting bracket including:
a first bracket strap including a first rotary bearing;
a second bracket strap, spaced apart from the first bracket strap by a space, including a second rotary bearing; and
at least one movable lock on one of the two bracket straps;
wherein the first and second bracket straps approach each other at their free ends,
wherein the field device is fitted into the space, and on two opposing sides is articulated on the two rotary bearings so that the field device is rotated, on an imaginary axis that extends through the space, from a first angle position to a second angle position;
wherein the field device may be swivelled by 180°,
wherein the lock engages the field device to resist a torque of the field device, in that the lock converts the torque to a pair of forces which is removable using (i) the second rotary bearing and (ii) the lock itself; and
wherein the first bracket strap includes a plurality of first through-holes that are arranged by a defined radian measure on a circular arc so as to be offset in relation to each other so that the field device is determinable at defined angle positions when in alternative installation states the lock engages a jacket surface of the field device through different ones of the first through-holes.

18. The field device of claim 17, wherein the lock includes a screw which engages the field device to permanently determine the second angle position.

19. The field device of claim 18, wherein the first bracket strap includes at least one first through-hole through which the screw engages the jacket surface of the field device so as to permanently determine the second angle position.

20. The field device of claim 19, wherein the second bracket strap includes at least a second through-hole of a circular-arc shape, through which through-hole the screw engages the jacket surface of the field device in order to tighten the field device in the second angle position to the second bracket strap.

21. The field device of claim 20, wherein a center of the circular-arc-shaped second through-hole is situated on the imaginary axis that extends through the space between the first bracket strap and the second bracket strap.

22. The field device of claim 18, wherein the screw for affixing the field device is screwed through one of the first through-holes into a suitable opening of the jacket surface of the field device.

23. The field device of claim 18, further comprising:
a connecting web interconnecting the first bracket strap and the second bracket strap, the connecting web extending parallel in relation to the imaginary axis that is defined by the space between the first bracket strap and the second bracket strap, the connecting web, at its middle, including a through-hole for attaching the mounting bracket to an attachment surface.

24. The field device of claim 18, wherein the first rotary bearing and the second rotary bearing are through-holes in the two bracket straps, in which the field device is articulated using two pivots.

25. The field device of claim 17, wherein an individual first through-holes of the plurality of first through-holes are arranged so as to be offset in relation to each other by a radian measure of a multiple of $\pi/8$.

26. The field device of claim 17, wherein the field device is a fill level measuring device, wherein the space is in one of a region of a process connection and a region of an aerial collar.

* * * * *